United States Patent [19]

Jacobson

[11] Patent Number: 4,659,098
[45] Date of Patent: Apr. 21, 1987

[54] SEMI-RECUMBENT BICYCLE

[76] Inventor: Stephen A. Jacobson, 2719 Payne St., Evanston, Ill. 60201

[21] Appl. No.: 615,897

[22] Filed: May 31, 1984

[51] Int. Cl.$^4$ .............................................. B62K 3/02
[52] U.S. Cl. ............................. 280/281 LP; 280/220; 280/261; 280/263
[58] Field of Search ............... 280/220, 259, 261, 263, 280/281 LP, 281 W, 281 B, 240, 289 A

[56] References Cited

U.S. PATENT DOCUMENTS

| | | | |
|---|---|---|---|
| 2,482,472 | 9/1949 | Fried | 280/261 |
| 3,753,577 | 8/1973 | Robinson | 280/261 |
| 4,030,774 | 6/1977 | Foster | 280/261 |
| 4,108,460 | 8/1978 | Silva, Jr. | 280/236 |
| 4,283,070 | 8/1981 | Forrestall et al. | 280/274 |
| 4,303,256 | 12/1981 | Mortensen | 280/261 |
| 4,333,664 | 6/1982 | Turner et al. | 280/261 |
| 4,373,740 | 2/1983 | Hendrix | 280/281 LP |
| 4,410,198 | 10/1983 | Fernandes et al. | 280/281 LP |
| 4,432,561 | 2/1984 | Feikema et al. | 280/281 LP |
| 4,437,677 | 3/1984 | Ksayian | 280/240 X |
| 4,447,088 | 5/1984 | Budloric | 280/289 A X |
| 4,456,277 | 6/1984 | Carpenter | 280/289 A X |
| 4,502,705 | 3/1985 | Weaver | 280/261 |

FOREIGN PATENT DOCUMENTS

| | | |
|---|---|---|
| 852545 | 2/1940 | France . |
| 918778 | 2/1947 | France . |
| 357837 | 3/1938 | Italy . |
| 253406 | 6/1926 | United Kingdom ......... 280/281 LP |
| 453687 | 10/1936 | United Kingdom . |

OTHER PUBLICATIONS

Photograph appearing in Chicago Sun-Times Newspaper on Mar. 20, 1984.

Primary Examiner—John J. Love
Assistant Examiner—Charles R. Watts
Attorney, Agent, or Firm—Willian Brinks Olds Hofer Gilson & Lione Ltd.

[57] ABSTRACT

A semi-recumbent bicycle having a conventional wheelbase. The frame of the bicycle has a unique geometric configuration in that the main tube of the frame is straight such that its axis forms an acute angle with the line of the ground so that the main tube is higher at its rear end than at its front end. This novel arrangement permits the semi-recumbent bicycle to be more easily manufactured and assembled because all of the major components of the bicycle are aligned directly off of the main tube and there is no need, with the exception of the rear triangle which supports the rear wheel, to align and fit together the component parts of the bicycle. Moreover, the semi-recumbent bicycle may be operated by riders of many different sizes because the bicycle seat is adjustable along the main tube toward and away from the foot pedals. The unique geometric configuration also enhances the range of adjustability of the seat and makes it possible to provide a luggage rack which is connected to the back of the seat. In addition, handlebars are rotatably mounted to the seat such that an adjustment of the seat automatically results in the correct positioning of the handlebars.

35 Claims, 4 Drawing Figures

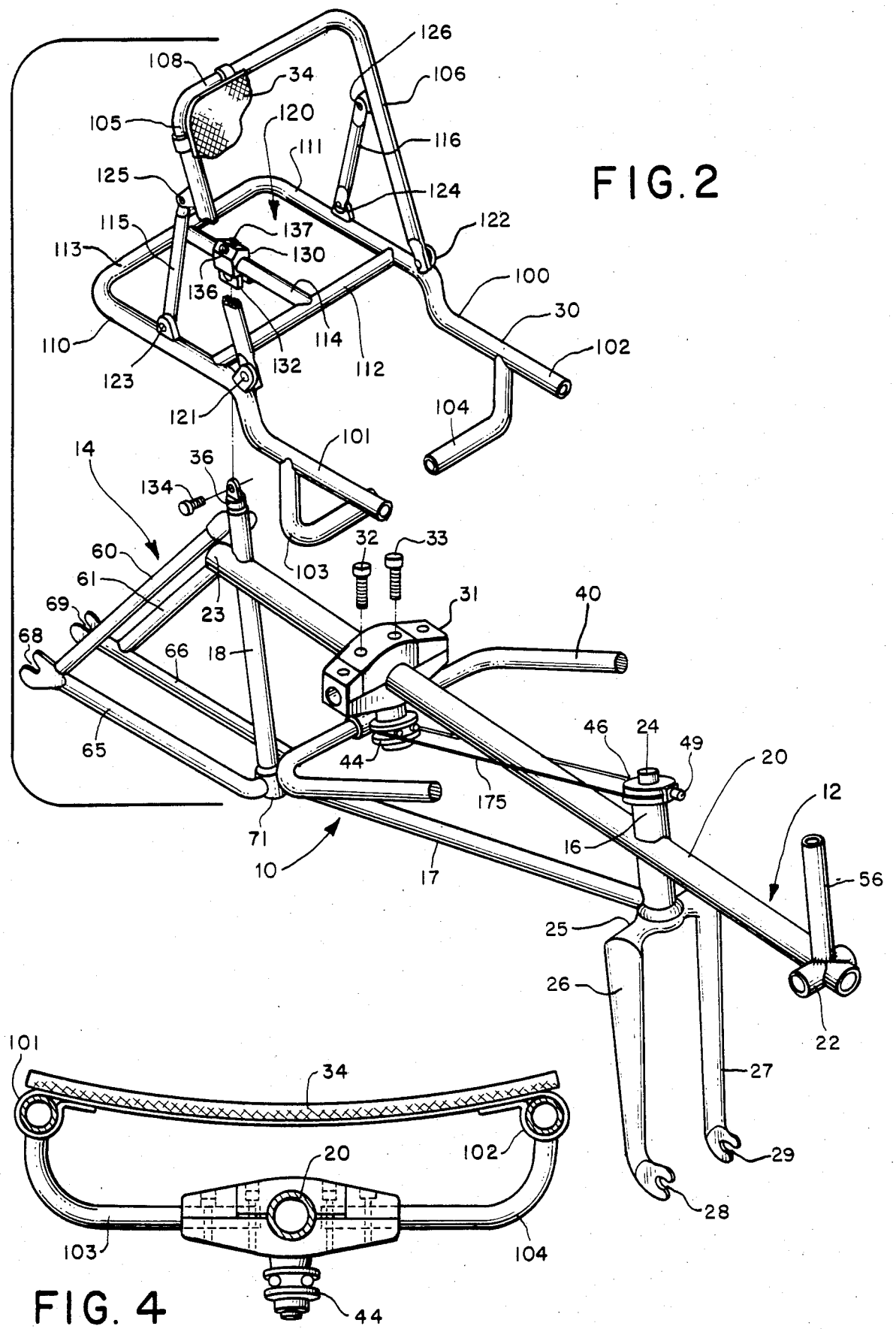

SEMI-RECUMBENT BICYCLE

BACKGROUND OF THE INVENTION

This invention relates to a new and useful semi-recumbent bicycle. Specifically the invention relates to a novel semi-recumbent bicycle which may be operated by riders of many different sizes and that has a conventional wheelbase with greater stability, better handling and more maneuverability than is typically present in recumbent bicycles.

Semi-recumbent bicycles differ from conventional bicycles in that the semi-recumbent bicycle is constructed so that it may be operated by the rider from a reclining or semi-reclining position. The rider sits behind the pedals in a seat which is usually provided with a backrest, in a relatively horizontal position rather than the more vertical position normally assumed by the rider of a conventional bicycle.

Semi-recumbent bicycles have many advantages over conventional bicycles. The semi-recumbent bicycle is more aerodynamically efficient than a conventional bicycle because of the relatively horizontal position of the rider. Unlike a conventional bicycle, where the rider assumes a relatively vertical position with his or her legs extending downward in a generally vertical direction, in the case of a recumbent bicycle, the relative arrangement of the bicycle seat and pedals causes the legs of the rider to extend forward substantially parallel to the ground. The rider, instead of leaning forward into the wind as is true with conventional bicycles, is able to lean back, his or her body forming a sloping shape with respect to the forward direction.

Semi-recumbent bicycles are also regarded as safer than conventional bicycles because of the feet-forward riding position assumed by the rider of a semi-recumbent bicycle. The rider can brace himself or herself with his or her feet and is also better able to stay seated in the event of a head-on collision. The rider of a semi-recumbent bicycle has the ability, unlike in conventional bicycles, to brake with both feet should it be necessary. Braking capability is greater and the danger of being pitched forward is greatly reduced because of the low center of gravity and feet-forward riding position. Thus, a higher degree of deceleration and faster stops can be achieved by the rider of a semi-recumbent bicycle than by the rider of a conventional bicycle.

In addition, the seat on a semi-recumbent bicycle is generally larger, more comfortable, and provides better support for the rider's back than is true in conventional bicycles. The relatively horizontal position assumed by the rider also aids in comfort and allows the rider to cover greater distances with less fatigue since the rider's back is better supported and the upper torso and arms are relatively relaxed while full power is applied by the rider to the foot pedals.

It is also possible for the rider of a recumbent bicycle to more easily generate greater thrust power and more rapidly accelerate because the rider can brace himself or herself against the seat while pushing the foot pedals with his or her feet. There is also less wind resistance encountered by the rider of a recumbent bicycle because of the rider's relatively horizontal position with respect to the ground. In addition, easier cornering is possible since the pedals are generally high enough so that they will not hit the ground when cornering.

Notwithstanding the numerous advantages of semi-recumbent bicycles, they have not been as popular as conventional bicycles. This is due to the fact that many of the semi-recumbent bicycles of the prior art suffer from several drawbacks and deficiencies. For example, a major problem with recumbent bicycles of the prior art is that they have generally been designed with either relatively short or long wheelbases as compared to the wheelbase of a conventional bicycle. Some recumbent bicycles have been designed with foot pedals in front of the front wheel. Generally, these bicycles have had relatively short wheelbases because it has been the practice to locate the handlebars such that they are directly attached for rotation in the front wheel tube or head tube of the frame. Because of this practice, it has been necessary to locate the handlebars as closely as possible within arms length of the rider. Consequently, the front wheel must be relatively close to the rear wheel and, therefore, such bicycles have a relatively short wheelbase. In addition, the geometric configuration of the bicycle frame of recumbent bicycles designed with the foot pedals in front of the front wheel has been such that the ability to adjust the seat to accommodate many different sized riders has been very limited. Some such designs have also prevented the placement of a luggage rack behind the back of the seat.

Other recumbent bicycles have been designed so that the foot pedals are placed between the front and rear wheels as is done with conventional bicycles. These designs however necessarily require a very long wheelbase. Both of these approaches cause problems with respect to stability and handling, and in the case of bicycles with relatively long wheelbases, the ability to make small turns and more easily maneuver is greatly diminished.

The design of many prior art recumbent bicycles also suffer from a substantial disadvantage in that the position of the seat is generally relatively fixed with respect to the pedal position thereby requiring various sized frames for different sized riders. Many recumbent bicycles, and in particular, those where the pedals are placed in front of the front wheel, are also designed so that the handlebars are placed in a fixed position with respect to the pedal position. This not only affects the bicycle manufacturing costs and the inventory requirements of bicycle supplier and retailer but also restricts the numbers of persons who are able to use a particular recumbent bicycle. Indeed it should also be noted that conventional bicycles also suffer from this disadvantage.

Some of the prior art has attempted to overcome these problems by using adjustable seats so that the seat-to-pedal distance is adjustable. For example, U.S. Pat. No. 4,283,070 (Forrestall et al.) discloses a recumbent bicycle having a carriage unit comprising a seat assembly and handle bars. The carriage unit is adjustably mounted on the frame of the bicycle so that it is movable toward and away from the foot pedals in order to accommodate different sized riders. In this particular type of approach, however, the pedals of the bicycle have been placed between the front and rear wheels of the bicycle, thereby necessitating a relatively long wheelbase. Indeed, a specific object of the bicycle disclosed in U.S. Pat. No. 4,283,070 (Forrestall et al.) is to provide a recumbent bicycle having a relatively long wheel base.

In another approach attempting to overcome these problems, other prior art has placed the pedals in front of the front wheel rather than between the front and rear bicycle wheels. However, in those cases, the handlebars have been fixed with respect to the front wheel and the seat has been adjustable only over a relatively short distance so that the bicycle will accommodate only a limited number of different sized riders. For example, in U.S. Pat. No. 4,333,664 (Turner et al.), the handlebars of the recumbent bicycle are rotatably mounted to a front fork support housing such that the handlebars extend beneath the legs of the rider. In this design, where the handlebars are directly attached for rotation in the head tube of the frame, it is necessary to locate the handlebars as closely as possible within arms length of the rider resulting in the front wheel being relatively close to the rear wheel. Thus, the wheelbase of such recumbent bicycles is shorter and of a less stable design than the conventional bicycle.

In addition, in the bicycle disclosed in U.S. Pat. No. 4,333,664 (Turner et al.) the seat may be moved only three inches from its back position to its most forward position. Moreover, any further adjustability is severely limited by the geometric configuration of the Turner et al. bicycle in that the seat is placed between the handlebars and support members 60a and 60b. As a result, in designs of this type it is still necessary to have various sized frames for different sized riders. Indeed, in U.S. Pat. No. 4,333,664 (Turner et al.) it is specifically recognized that the front section may be made longer for taller riders, or shorter for shorter riders. These designs also suffer from the substantial disadvantage of having a relatively short wheelbase.

It is thus a primary object of the present invention to provide an improved semi-recumbent bicycle having many of the advantages of prior art recumbent designs, while reducing or overcoming the disadvantages inherent in those designs.

A more specific object of the present invention is to provide an improved semi-recumbent bicycle in which the seat-to-pedal distance is adjustable.

Another object of the present invention is to provide a universal sized semi-recumbent bicycle for substantially all riders.

A further object of the present invention is to provide a semi-recumbent bicycle having a conventional wheelbase which has greater stability and better handling than prior art recumbent bicycle designs in which the foot pedals are placed in front of the front wheel and which has more maneuverability and a smaller turning radius than would otherwise be possible in prior art recumbent bicycle designs in which the foot pedals are placed between the front and rear wheels.

Moreover, an object of the present invention is to provide a semi-recumbent bicycle of a design having handlebars which are connected to the adjustable seat such that the adjustment of the seat results in a corresponding correct positioning and adjustment of the handlebars.

Yet another object of the present invention is to provide a luggage rack which is integrally connected with the seat.

Moreover, an object of the present invention is to provide a semi-recumbent bicycle in which the seat is easily foldable and in which the front section of the bicycle is easily foldable so that the bicycle may be more easily stored or transported.

A still further object of the present invention is to provide a semi-recumbent bicycle of a simpler design that is easier and less costly to manufacture and assemble and which is easier to correctly align and fit together so it will operate properly.

Other objects of the present invention will occur to those skilled in the art upon reading this disclosure.

SUMMARY OF THE INVENTION

The foregoing objects, along with numerous features and advantages are achieved in a semi-recumbent bicycle having a frame with a unique geometric configuration. More particularly, the frame of the present invention is constructed of a main tube that forms an acute angle with the line of the ground so that the main tube is higher at its rear end than at its front end. A rear wheel is rotatably supported at the rear end of the main tube and a front wheel is rotatably supported at a point on the main tube intermediate the rear end and the front end of the main tube. The front wheel and the rear wheel are spaced apart so that the distance between the centers of the points of contact of the front wheel and the rear wheel with the ground is a distance that is substantially similar to the wheelbase of a conventional bicycle.

BRIEF DESCRIPTION OF DRAWINGS

FIG. 2 is a perspective view of the preferred embodiment of the semi-recumbent bicycle of the present invention.

FIG. 4 is a cross-sectional view of the semi-recumbent bicycle shown in FIG. 1 taken along lines 4—4 thereof.

DETAILED DESCRIPTION OF THE INVENTION

Figure 1:
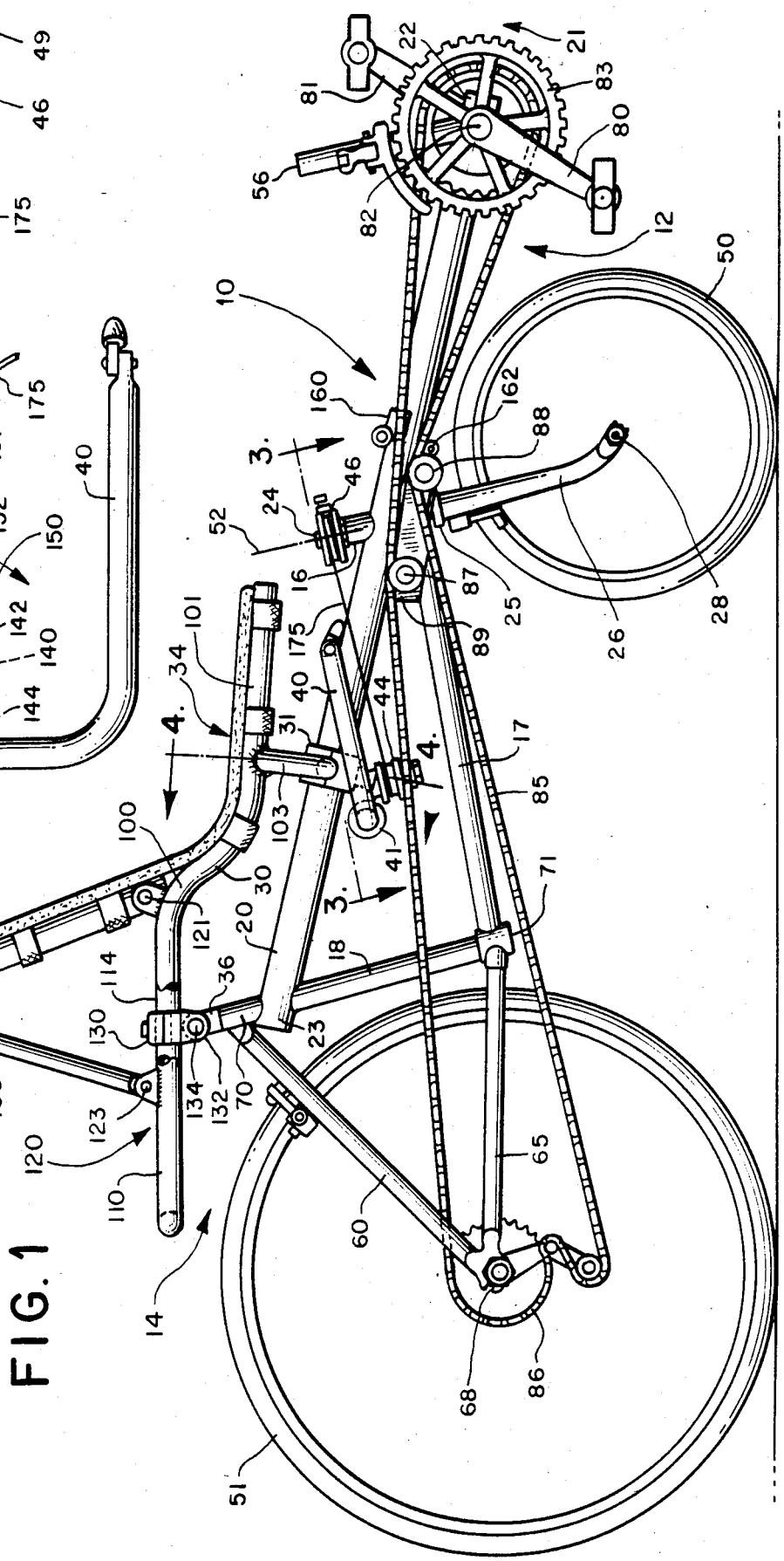
FIG. 1 is a side view of the preferred embodiment of the semi-recumbent bicycle of the present invention.

Referring to FIG. 1, the semi-recumbent bicycle generally includes a frame 10 having a front portion 12 and a rear portion 14. Main tube 20 which is about 46 inches in length extends between the front portion 12 and the rear portion 14 for supporting seat assembly unit 30 comprising a seat 34 and handlebars 40. Front wheel 50 which is 16 inches in diameter supports the front portion 12 of the frame 10 and a rear wheel 51 which is a standard 27 inch wheel supports the rear portion 14 of the frame 30 while drive means including foot pedals 80, 81 mounted to the front portion 12 of the frame 10 for reciprocal movement are provided for rotatably driving the rear wheel 51.

In the preferred embodiment of the invention, the main tube 20 of the frame 10 is straight. The axis 21 of the main tube 20 forms an acute angle of about 10½ degrees with the line contacting the contact surfaces of the front wheel 50 and the rear wheel 51 such that the main tube 20 is higher at its rear end 23 than its front end 22. Main tube 20 is connected at its rear end 23 to rear tube 18 which is 14 inches in length. Front wheel tube 16 is connected to main tube 20 at a point on main tube 20 intermediate front end 22 and rear end 23 of main tube 20. Bottom tube 17 which is 21 inches long is connected between front wheel tube 16 and rear tube 18 and extends in a downward direction from front wheel tube 16 toward rear tube 18 below and at an angle to main tube 20 such that bottom tube 17 is higher at its front end than its rear end.

As shown in FIGS. 1 and 2, the rear portion 14 of the frame 10 includes a pair of upper braces 60 and 61 each 16½ inches in length extending from upper end 70 of rear tube 18 and on opposite sides of rear wheel 51 to the axle of the rear wheel. A pair of lower braces 65 and 66 each 14 inches long extend from the bottom end 71 of rear tube 18 on opposite sides of the rear wheel 51 where they are connected to the ends of the upper braces 60 and 61, respectively. Junctions 68 and 69 formed by upper and lower braces 60 and 65 and upper and lower braces 61 and 66 are suitably connected, respectively, to the opposite sides of the axle of rear wheel 51 so that rear wheel 51 supports the rear portion 14 of frame 10. Junctions 68 and 69 are adapted so that rear wheel 51 may freely rotate between upper braces 60, 61 and lower braces 65, 66.

The front portion 12 of frame 10 is supported by front wheel 50. Front wheel tube 16 of frame 10 rotatably supports front axle 24. Front axle 24 is fixedly secured to forked yoke 25 which includes forks 26 and 27 disposed on opposite sides of front wheel 50. The forks 26 and 27 are curved and contain slots 28 and 29 at their ends, respectively, to support the front wheel 50. Slots 28 and 29 are adapted so that front wheel 50 may freely rotate between forks 26 and 27. Front wheel 50 is capable of being turned with respect to the frame about the turning axis 52 which extends through the general plane of the front wheel 50.

Pedal assembly tube 56 is connected to the front end 22 of the main tube 20. Means for rotatably driving rear wheel 51 includes foot pedals 80 and 81 which are connected together by pedal axle 82 which is suitably mounted on the front end 22 of main tube 20. The distance between front wheel tube 16 and pedal axle 82 is 19 inches so that in operation the foot pedals 80, 81 and front wheel 50 do not interfere with each other. Foot pedals 80 and 81 are each mounted at one end to pedal axle 82 so as to rotate with the axle, and extend in diametrically opposite directions. A sprocket gear 83 is suitably connected to the pedal axle 82 for rotation therewith. The sprocket gear 83 may or may not form a front derailleur as is well known in the art. If a front derailleur is provided it may be suitably mounted to pedal assembly tube 56. Chain 85 extends around pulleys 87 and 88, which are rotatably mounted to plate 89 which in turn is mounted to main tube 20, and chain 85 suitably couples sprocket gear 83 to the gear or gears 86 of rear wheel 51. The gear 86 may or may not form a rear derailleur as is well known in the art.

As best shown in FIG. 1, in the preferred embodiment, the axes of rear tube 18, front wheel tube 16 and pedal assembly tube 56 are parallel to one another in the general plane of front wheel 50 and rear wheel 51. More specifically, the axes of rear tube 18, front wheel tube 16 and pedal assembly tube 56 each form an angle of 73 degrees with the line connecting the contact surfaces of front wheel 50 and rear wheel 51. It will be appreciated that because these axes are parallel, it is much greater to manufacture and assemble the present invention since the major components of the frame 10 are automatically aligned directly off of main tube 20. There is no need to align these parts with respect to one another nor is there any need to fit pieces together.

It should also be appreciated that the unique geometric configuration of the frame 10, in accordance with the present invention, allows the semi-recumbent bicycle to have a wheelbase which is substantially similar to the wheelbase of a conventional bicycle which typically is between 37 and 42 inches. Thus, in the preferred embodiment of the present invention, as shown in FIG. 1, the distance between the centers of the points of contact of front wheel 50 and rear wheel 51 with the ground is approximately 41 inches.

Referring now to FIG. 2, the seat assembly unit 30 includes seat 34 and is mounted for movement along main tube 20 of frame 10 toward and away from foot pedals 80 and 81 so as to accommodate various sized riders. Seat assembly unit 30 includes seat clamp 31 for supporting both the seat 34 and handlebars 40. Seat clamp 31 is adapted for adjustably mounting seat assembly unit 30 to main tube 20 of frame 10. As shown in FIG. 4, the inner surface of seat clamp 31 fits snugly around the outer surface of main tube 20. Seat clamp 31 includes screws 32 and 33 which when loosened allow seat clamp 31 and accordingly seat assembly unit 30 to slide along main tube 20. Tightening screws 32, 33 securely locks seat assembly unit 30 into the desired position on main tube 20.

Seat assembly unit 30 includes a seat frame 100 which, at its front portion forms seat 34 and at the rear portion forms luggage rack 120. Frame 100 include side tubes 101 and 102. Cross bars 103 and 104 support seat frame 100 and are connected, respectively, to side tubes 101 and 102, and seat clamp 31. Backrest tubes 105 and 106 are pivotally secured by means of pivot screws 121 and 122 to side tubes 101 and 102, respectively. Top tube 108 extends between backrest tubes 105 and 106. A suitable material such as cloth can be secured between side tubes 101, 102 and backrest tubes 105, 106 to form the seat 34. The rear of side tubes 101, 102 extend to luggage rack tubes 110 and 111. Front cross tube 112 and rear cross tube 113 extend between luggage rack rubes 110, 111. Center tube 114 is connected between front cross tube 112 and rear cross tube 113. Support tubes 115, 116 are pivotally secured at each end to luggage rack tubes 110, 111 and backrest tubes 105, 106 by means of pivot screws 123, 124 and 125, 126. Bracket 130 fits snuggly around the outer surface of center tube 114 at the middle section of center tube 114. Bracket 130 is pivotally connected by means of pivot bracket 132 to seat post 36 which is supported by rear tube 18. Loosening screw 134 of pivot bracket 132 allows pivot bracket 132 to rotate about the axis of screw 134 so that seat frame 100 and luggage rack 120 of seat assembly unit 30 may be tilted if desired. Screws 136 and 137 are located at the top of bracket 130 and may be loosened to allow seat assembly unit 30 to be adjusted forwards or backwards by permitting center tube 114 to slide forwards or backwards through bracket 130. Seat assembly unit 30 may be locked in place by tightening screws 136 and 137.

Seat steering spool 44 is rotatably mounted to the bottom of seat clamp 31. Handlebar clamp 41 is provided for releasably securing handlebars 40 and is connected to seat steering spool 44. Handlebar clamp 41 extends around handlebars 40 and includes quick release means in the form of screw 42. Loosening screw 42 allows handlebars 40 to be tilted into any desired position. Once a desired position for handlebars 40 is selected the handlebars 40 may be locked into position by tightening screw 42. Handlebars 40 may be provided with grips, as well as brake levers and gear shift levers which are suitably coupled through control cables to the respective brakes and transmission gears as is well known in the art.

Figure 3:
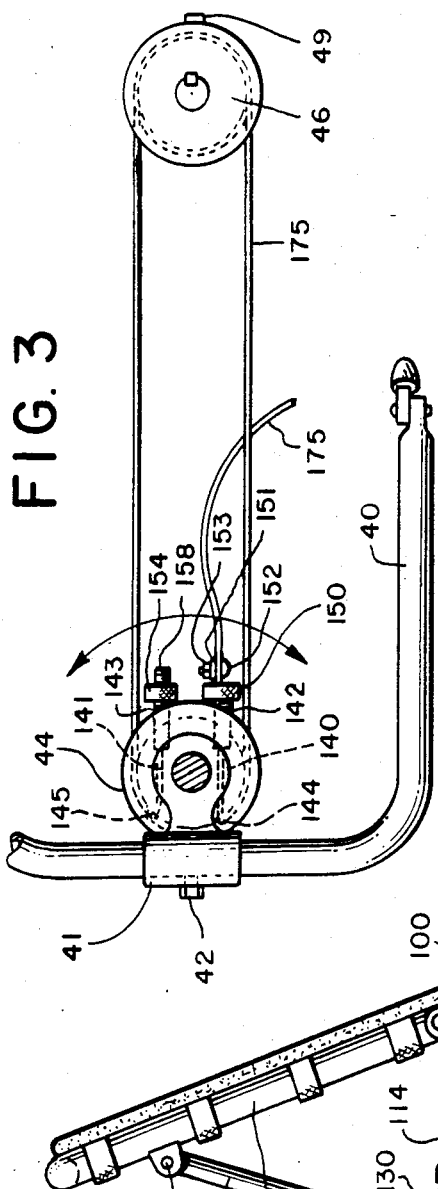
FIG. 3 is a partial plan view of the semi-recumbent bicycle shown in FIG. 1 taken along lines 3—3 thereof, illustrating the path of the steering cable which links the handlebars to the front axle.

Front wheel steering spool 46 is suitably secured at the top of front axle 24. Steering cable 175 is provided to link seat steering spool 44 and front wheel steering spool 46 together so that in operation, when handlebars 40 are rotated or turned, front wheel axle 24 and hence front wheel 50 is rotated or turned about its turning axis 52. The path of steering cable 175 is best shown in FIG. 3. Seat steering spool 44 has parallel bores 140 and 141 which extend between front spool openings 142 and 143, and rear spool openings 144 and 145, respectively. Cable screw 150 having a center bore is threaded into front spool opening 142. Cable clamp means comprising cable bolt 152 having a center bore and cable nut 153 are suitably fitted through washer 151 which is positioned adjacent cable screw 150. Steering cable 175 passes through the center bore of cable bolt 152, the axis of which is aligned with the axis of cable screw 150, and is held in place between washer 151 and cable nut 153. Tightening of cable bolt 152 and cable nut 153 securely locks steering cable 175 in place.

As best shown in FIG 3, starting from front spool opening 142, steering cable 175 passes through the bore of cable screw 150 through bore 140 and rear spool opening 144 and then wraps partially around seat steering spool 44, extends to front wheel steering spool 46 where it is wrapped around once and held in place by screw 49, and then extends back to seat steering spool 44 where it passes through rear spool opening 145, bore 141 and the center bore of cable screw 154 which is threaded into front spool opening 143 and bore 141. End cap 158 at the end of steering cable 175 serves as a stop and keeps the end of steering cable 175 from being pulled through cable screw 154 so that the end of steering cable 175 is fixed in position. Thus, when seat assembly unit 30 is adjusted along main tube 20, cable bolt 152 and cable nut 153, and screw 49, may be loosened so that the path of steering cable 175 between seat steering spool 44 and front wheel steering spool 46 may be lengthened or shortened as necessary to conform to the movement of seat assembly unit 30 along main tube 20.

The seat assembly unit 30 is easily adjustable along the length of main tube 20. Loosening screws 32, 33 of seat clamp 31, and screws 136, 137, as well as cable bolt 152, cable nut 153 and screw 49, allows the seat assembly unit 30 to easily slide along the main tube 20 towards or away from foot pedals 80, 81. When the seat assembly unit 30 is positioned at the desired location on main tube 20 relative to foot pedals 80, 81, seat assembly unit 30 can easily be locked into position by tightening screws 32, 33 and 136, 137. Steering cable 175 may be locked into position by tightening cable bolt 152, cable nut 153, and screw 49. It should be appreciated that the adjustment of the seat assembly unit 30 automatically results in the correct and proper adjustment of handlebars 40 regardless of the position of the seat assembly unit.

Furthermore, seat frame 100 of seat assembly unit 30 may be easily folded by loosening pivot screws 121, 122 and 123, 124 and 125, 126 so that the upper ends of support tubes 115, 116 are detached from backrest tubes 105, 106. This allows support tubes 115, 116 to pivot forward and backrest tubes 105, 106 to pivot backwards so that each of these tubes may lay flat on luggage rack tubes 110, 111.

As shown in FIG. 1, hinge assembly 160 may be provided at a point on main tube 20 in front of front wheel tube 16 so that the front end of main tube 20 may be easily folded by loosening the clamp 162 of hinge assembly 160. This arrangement makes it very easy to transport or store the bicycle.

Many changes and modifications which do not part from the true scope of the invention will occur to those skilled in the art upon reading this disclosure. All such changes and modifications are intended to be covered by the appended claims.

I claim:
1. A semi-recumbent bicycle comprising:
   a single main tube which is straight having a substantially uniform cross-section throughout its length, the axis of said main tube forming an acute angle with the line of the ground such that said main tube is higher at its rear end than at its front end;
   means for rotatably supporting a rear wheel, said means for rotatably supporting said rear wheel being connected to the rear end of said main tube; and,
   means for rotatably supporting a front wheel such that said front wheel is spaced apart from said rear wheel so that the distance between the centers of the points of contact of said front wheel and said rear wheel with the ground is a distance substantially between about 37 and about 42 inches, said means for rotatably supporting said front wheel being mounted to said main tube at a point on said main tube intermediate the rear end and the front end of said main tube which is closer to the front end than the rear end of said main tube.

2. The semi-recumbent bicycle of claim 1 further comprising:
   driving means for driving said rear wheel, said drive means including foot pedals rotatably mounted to the front end of said main tube;
   seat means mounted on said main tube; and,
   steering means rotatably mounted to said seat means.

3. The semi-recumbent bicycle of claim 2 wherein said rear wheel support means includes a rear tube connected to the rear end of said main tube and wherein said front wheel support means includes a front wheel tube connected to said main tube at a point on said main tube intermediate the rear end and the front end of said main tube.

4. The semi-recumbent bicycle of claim 3 wherein the axis of the rear tube is parallel to the axis of the front wheel tube.

5. The semi-recumbent bicycle of claim 4 further comprising a pedal assembly tube wherein the axis of said pedal assembly tube is parallel to the axes of said rear tube and said front wheel tube.

6. The semi-recumbent bicycle of claim 3 further comprising means for hinging said main tube about a point between the front end of said main tube and said front wheel tube.

7. The semi-recumbent bicycle of claim 2 wherein said steering means comprises handlebars rotatably mounted to said seat means and a steering cable for linking said handlebars to said front wheel support means such that rotation of said handlebars causes said front wheel to rotate about a turning axis.

8. The semi-recumbent bicycle of claim 7 wherein said seat means is adjustably mounted on said main tube so that said seat means is moveable toward and away from said foot pedals.

9. The semi-recumbent bicycle of claim 8 wherein adjustment of said seat means automatically results in proper positioning of said handlebars.

10. The semi-recumbent bicycle of claim 9 wherein said seat means includes a seat and further comprises a luggage rack connected to said seat.

11. The semi-recumbent bicycle of claim 10 wherein said seat includes a backrest.

12. The semi-recumbent bicycle of claim 11 wherein said backrest can be folded so that it lays flat in a horizontal position.

13. A semi-recumbent bicycle comprising:
a frame having a front portion and a rear portion;
a continuous tube which is straight extending between said front portion and said rear portion of said frame, said tube having a substantially uniform cross-section throughout its length and forming an acute angle with the line of the ground such that said tube is relatively higher at its rear end that at its front end;
a rotatable rear wheel for supporting the rear portion of the frame;
a rotatable front wheel for supporting the front portion of said frame, said rotatable front wheel being mounted to said tube closer to the front end than the rear end of said tube and capable of being turned with respect to said frame about a turning axis extending through the general plane of the rotatable front wheel, said rotatable front wheel being spaced apart from said rotatable rear wheel a distance substantially between about 37 and about 42 inches;
drive means for rotatably driving said rotatable rear wheel, said drive means including foot pedals rotatably mounted to said front portion of said frame;
a seat assembly unit including a seat, said seat assembly unit being mounted directly on said tube; and,
steering means mounted to said seat assembly unit including handlebars, said steering means being coupled to said rotatable front wheel so that movement of said handlebars causes said rotatable front wheel to rotate about said turning axis.

14. The semi-recumbent bicycle of claim 13 wherein said seat assembly unit is adjustably mounted on said tube so that said seat assembly unit is moveable toward and away from said foot pedals in order to accommodate various sized riders.

15. The semi-recumbent bicycle of claim 14 wherein said handlebars are rotatably mounted to said seat assembly unit so that adjustment of said seat assembly unit automatically results in the correct positioning of said handlebars in order to accommodate various sized riders.

16. The semi-recumbent bicycle of claim 15 wherein said tube is about 46 inches in length.

17. The semi-recumbent bicycle of claim 16 wherein said tube is straight.

18. A semi-recumbent bicycle comprising:
a frame having a front portion and a rear portion, said frame comprising,
a main tube which is substantially straight having a substantially uniform cross-section throughout its length extending between said front portion and said rear portion such that the axis of said main tube forms an acute angle with the line of the ground and is higher at its rear end than at its front end, a rear tube connected to the rear end of said main tube, a front wheel tube connected to said main tube at a point on said main tube closer to the rear end than the front end of said main tube, and a bottom tube extending between said rear tube and said front wheel tube in a downward direction toward said rear tube below and at an angle to said main tube such that said bottom tube is higher at its front end than at its rear end;
means for rotatably supporting a rear wheel, said means for rotatably supporting said rear wheel including a pair of upper braces extending from the upper end of said rear tube on opposite sides of said rear wheel and a pair of lower braces extending from the bottom end of said rear tube on opposite sides of said rear wheel to form a pair of junctions with said pair of upper braces, said junctions being adapted to rotatably support said rear wheel;
means for rotatably supporting a front wheel such that said front wheel is spaced apart from said rear wheel so that their wheelbase is substantially between about 37 and about 42 inches, said means for rotatably supporting said front wheel including a front axle rotatably supported by said front wheel tube and a forked yoke fixedly secured to said front axle, said forked yoke including a pair of forks disposed on opposite sides of said front wheel which have a pair of slots at their ends which are adapted to rotatably support said front wheel;
a pedal assembly tube mounted to the front end of said main tube;
drive means for driving said rear wheel including foot pedals rotatably mounted to the front end of said main tube, said drive means having a rear sprocket gear which forms a rear derailleur, a front sprocket gear coupled to said foot pedals which forms a front derailleur mounted to said pedal assembly tube, and a chain which couples said front and rear sprocket gears;
a seat assembly unit including a seat and a luggage rack, said seat assembly unit being mounted for movement along said main tube toward and away from said foot pedals; and,
steering means including handlebars rotatably mounted to said seat assembly unit and a steering cable for linking said handlebars to said front axle such that rotation of said handlebars causes said front wheel to rotate about its turning axis, said handlebars being rotatably mounted to said seat assembly unit such that movement of said seat assembly unit along said main tube automatically results in a correct adjustment of said handlebars.

19. The semi-recumbent bicycle of claim 18 wherein the axes of said rear tube, said front wheel tube and said pedal assembly tube are parallel to one another.

20. The semi-recumbent bicycle of claim 3 wherein said main tube has a diameter greater than said rear tube and said front wheel tube.

21. The semi-recumbent bicycle of claim 4 wherein said main tube has a diameter greater than said rear tube and said front wheel tube.

22. The semi-recumbent bicycle of claim 5 wherein said main tube has a diameter greater than said pedal assembly tube, said rear tube and said front wheel tube.

23. The semi-recumbent bicycle of claim 19 wherein said main tube has a diameter greater than said rear tube, said front wheel tube, said bottom tube and said pedal assembly tube.

24. A semi-recumbent bicycle comprising:
a main tube which is substantially straight having a substantially uniform cross-section throughout its length, the axis of said main tube forming an acute angle with the line of the ground such that said main tube is higher at its rear end than at its front end;

a rear tube connected to the rear end of said main tube and a front wheel tube connected to said main tube at a point on said main tube closer to said front end of said main tube than said rear end of said main tube;

a bottom tube connected between said front wheel tube and said rear tube, said bottom tube extending in a downward direction from said front wheel tube toward said rear tube below and at an angle to said main tube such that said bottom tube is higher at its front end than at its rear end;

means for rotatably supporting a rear wheel, said means being connected to said rear tube;

means for rotatably supporting a front wheel having a diameter smaller than said rear wheel such that said front wheel is spaced apart from said rear wheel so that the distance between the centers of the points of contact of said front wheel and said rear wheel with the ground is a distance substantially between about 37 and about 42 inches, said means for rotatably supporting said front wheel being rotatably mounted to said front wheel tube;

drive means for driving said rear wheel, said drive means including foot pedals rotatably mounted to the front end of said main tube;

seat means mounted for movement along said main tube toward and away from said foot pedals;

steering means rotatably mounted to said seat means such that movement of said seat means along said main tube automatically results in a correct adjustment of said steering means and means for linking said steering means to said means for rotatably supporting said front wheel such that rotation of said steering means causes said front wheel to turn about a turning axis;

said main tube having a diameter greater than said rear tube, said front wheel tube and said bottom tube.

25. The semi-recumbent bicycle of claim 24 wherein said seat means comprises:

a pair of side tubes;

a pair of cross tubes each of which extends between and connects said pair of side tubes;

a pair of backrest tubes joined at their upper ends by a top tube and each of which is pivotally secured at its lower end to an associated one of said side tubes;

a pair of support tubes each of which is pivotally secured at one end to an associated one of said side tubes and at the other end to an associated one of said backrest tubes;

a center tube connected between said pair of cross tubes; and a pair of cross bars each of which is connected at one end to an associated one of said side tubes and at the other end to a seat clamp which is positioned between said other ends of said cross bars, said seat clamp being adapted to fit snuggly around the outer surface of said main tube.

26. The semi-recumbent bicycle of claim 25 further comprising a bracket adapted to fit snuggly around the outer surface of said center tube at the middle portion of said center tube, said bracket being pivotally connected to a seat post which is supported by said rear tube.

27. The semi-recumbent bicycle of claim 26 further comprising a cloth material secured between said pair of side tubes and said pair of backrest tubes.

28. The semi-recumbent bicycle of claim 27 wherein the rear portion of said pair of side tubes, said center tube, and said pair of cross tubes form a luggage rack.

29. The semi-recumbent bicycle of claim 28 wherein said steering means comprises:

a seat steering spool rotatably mounted to the bottom of said seat clamp;

handlebars releasably secured to said seat steering spool;

a front wheel steering spool secured to the top of said means for supporting said front wheel; and, a steering cable which links said seat steering spool and said front wheel steering spool.

30. The semi-recumbent bicycle of claim 24 wherein said main tube is about 46 inches in length and the axis of said main tube forms an acute angle of about 10½ degrees with the line of the ground.

31. The semi-recumbent bicycle of claim 30 wherein said front wheel tube is connected to said main tube at a distance of about 19 inches from said front end of said main tube.

32. The semi-recumbent bicycle of claim 31 wherein said rear tube is about 14 inches in length and said bottom tube is about 21 inches in length.

33. The semi-recumbent bicycle of claim 32 wherein said rear wheel has a diameter of about 27 inches and said front wheel has a diameter of about 16 inches.

34. The semi-recumbent bicycle of claim 33 wherein said means for rotatably supporting said rear wheel comprises a pair of upper braces each of which is about 16½ inches in length extending from the upper end of said rear tube and on opposite sides of said rear wheel to the axle of said rear wheel and a pair of lower braces each of which is about 14 inches in length connected at one end to the bottom end of said rear tube and connected at the other end to an associated one of said upper braces.

35. The semi-recumbent bicycle of claim 34 wherein said means for rotatably supporting said front wheel comprises a front axle rotatably supported by said front wheel tube, said front axle fixedly secured to a forked yoke which includes a pair of forks disposed on opposite sides of said front wheel, said forks each containing slots at their ends adapted to support said front wheel.

* * * * *